Dec. 6, 1932.  J. BEATTIE  1,890,361

TWO-WAY ELEVATING TRUCK

Filed April 30, 1930

INVENTOR
James Beattie,
BY
ATTORNEY

Patented Dec. 6, 1932

1,890,361

UNITED STATES PATENT OFFICE.

JAMES BEATTIE, OF SYDNEY, NEW SOUTH WALES, AUSTRALIA

TWO-WAY ELEVATING TRUCK

Application filed April 30, 1930, Serial No. 448,729, and in Australia May 29, 1929.

This invention has been principally devised for the conveyance of "green" bricks from the drying shed into the kiln, particularly those kilns of the continuous type, and by means of this invention, the truck is enabled to be moved in rectangular directions or paths without the aid of turntables and the like.

The invention is also adapted for use in goods sheds, warehouses and like places where goods are desired to be conveyed from a loading station, in rectangular directions and where the space is restricted.

In the use of the invention, less handling of the goods is required, and in the case of bricks, resulting in a reduced liability to disturbance and waste.

Figure 1:
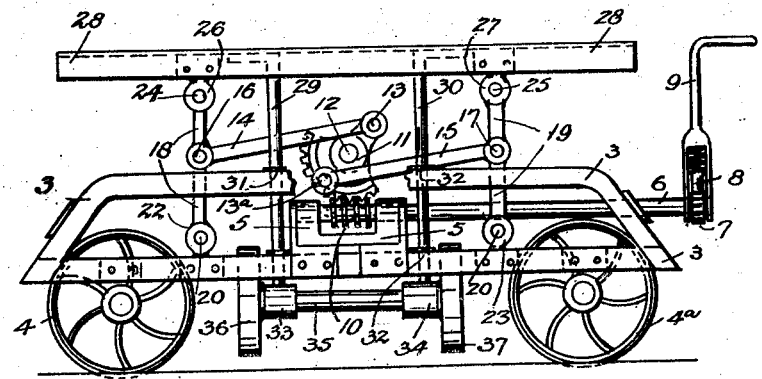

The construction and use of the invention will be described in its relation to a brick conveying truck and with the aid of the accompanying drawing wherein Fig. 1 is a side elevation showing the truck in position for travelling in a longitudinal direction.

Figure 2:
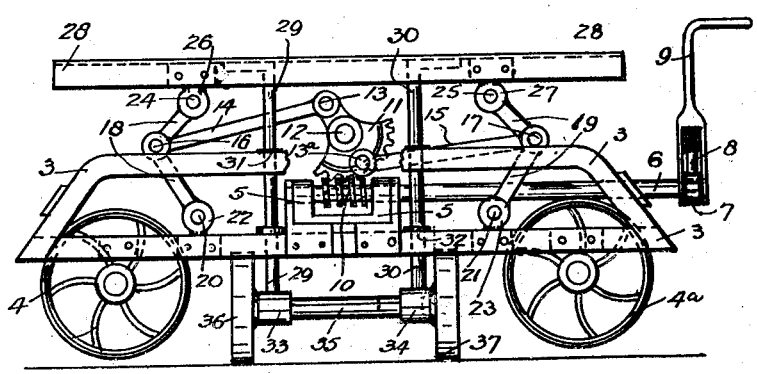

Fig. 2 is a like view showing the truck in position for travelling in a transverse direction.

In each of said views, portion of the body frame is broken away for sake of clearness.

Referring to the said drawing:—

I employ a body frame 3 carried on four ground or flanged rail wheels as 4 and 4a. On the said frame 3 and carried in suitable bearings 5 is installed a longitudinal shaft 6, on the outer end of which is keyed a ratchet wheel 7 adapted to be operated by reversible pawl 8 and handle 9.

Near to the inner end of the said shaft 6 is keyed a worm wheel 10 gearing with a toothed quadrant as 11 (or other approved shaped toothed member), carried on a transverse shaft 12 held in bearings (not shown) which are suitably secured to the body frame 3.

At an upper and lower position on said quadrant 11 is, by pivotal pins 13—13a carried the connecting rods 14—15, the opposite end of each of which is respectively and pivotally connected to the central transverse shafts 16 and 17 of the companion toggle joints 18—19. The lower hinge pins 20—21 of the said toggle joints 18—19 are carried in bearings 22—23 secured at a low position on the main body frame 3, while the upper hinge pins 24—25 of the said toggle joints 18—19 are carried in bearings 26—27 secured to the underside of an elevating table top or frame 28.

Also to the underside of the said table-top or frame 28 is secured downwardly extending leg members or pillars 29—30 held in guides 31—32, carried by the body frame, and at their lower ends, said pillars are anchored to bearings 33—34 (or a frame carrying said bearings) in each pair of which is held an axle 35, the latter carrying ground wheels 36—37, adapted to travel or move in a direction rectangular to that of the main ground or flanged wheels 4—4a before mentioned.

The operation of the invention is as follows:—

When the truck is travelling in a longitudinal direction, the rectangularly positioned wheels 36—37 are in a raised position, as shown in Fig. 1.

The "green" bricks in the drying shed are placed on a removable tray at a convenient height from the ground level; the table-top 28 of the truck is now slightly lowered by the ratchet wheel 7 and members 8 and 9 through worm and quadrant gear 10 and 11, and toggle joint members 18—19, whereupon the truck is moved beneath said tray of "green" bricks. The said table-top 28 of the truck, through said members is then raised by a reverse movement thereof so as to receive the load of bricks.

The truck containing the load of bricks is now moved on its wheels 4—4a to a convenient position within the kiln whereupon the table-top is again lowered until the rectangularly positioned ground wheels 36—37 make contact with the floor of the kiln. Upon the continued operation of the ratchet, worm and quadrant gear, toggle-joints and related members, the main frame 3 and thereon carried wheels 4—4a is raised from the floor level, thus allowing the said rectangularly positioned ground wheels 36—37 to take up the load as shown in Fig. 2, whereupon the truck is moved in a rectangular direction for the unloading operations.

When latter is completed, the truck is returned to the drying shed in a reverse manner and direction to that as above set forth, for a subsequent load of bricks.

What I claim as my invention and desire to secure by Letters Patent, is:—

1. In a truck of the type set forth, a wheeled body frame, a platform above said frame carrying wheels in planes at right angles to those of the wheels on the body frame, and toggle connections between the body frame and platform operative in one range of movement to adjustably support the platform above the body frame with the wheels thereof in raised position and operative in another range of movement to suspend the body frame from the platform with the wheels thereof in raised position.

2. In a truck of the character described, a frame, wheels carried by said frame for supporting said frame from the ground, a load-supporting platform above said frame, pillars depending from said platform and vertically movable in said frame, wheels journalled on said pillars below said frame, and toggle connections between said frame and platform, said toggle connections being operative, when moved from intermediate to extended position, to lift said platform and second named wheels relatively to said frame and support the same on said frame and, when moved from intermediate to collapsed position, to lower said platform and second named wheels relatively to said frame and cause the second-named wheels to engage the ground for suspending said frame from said platform.

3. In a truck of the character described, a wheeled frame, wheels in planes at right angles to the planes of the wheels on the frame, vertically movable means carrying the second-mentioned wheels, and toggle connections between said means and frame operative in one range of movement to adjustably support said vertically movable means on said frame with the wheels thereof in raised position and operative in another range of movement to adjustably suspend said frame from said vertically movable means with the wheels thereof in raised position.

4. In a truck of the character described, a wheeled body frame, a platform normally supported thereby, a toggle connection between said platform and body frame, means for extending and collapsing said toggle connection to raise and lower said platform relative to said body, wheels carried by said platform for engagement with the ground to support said platform upon partial collapsing of said toggle connections, said toggle connections serving upon continued collapsing thereof to raise said wheeled frame and suspend the same from said platform.

5. In a truck of the character described, a wheeled body frame, a wheeled platform in superposed relation thereto, a toggle connection between said frame and platform, operating means for extending and collapsing said toggle connection, said toggle connection serving, when in extended position, to support said platform on said frame with the wheels of the platform raised, and serving, when in collapsed position, to suspend said frame from said platform with the wheels of the frame in raised position.

6. In a truck of the character described, a wheeled body frame, a wheeled platform in superposed relation to said body frame, toggles connecting said frame and platform, a worm and driving means therefor mounted on said frame, a toothed gear member meshing with said worm, and links connecting said gear member and toggles to effect the extension and collapsing of said toggles, said toggles operating from an intermediate to an extended position as an adjustable support for said platform and from an intermediate to a collapsed position as a suspension means for said frame.

In testimony whereof I have hereunto set my hand.

JAMES BEATTIE.